No. 657,569. Patented Sept. 11, 1900.
J. SCHAUB.
PHOTOGRAPHIC CAMERA.
(Application filed Oct. 5, 1899.)

(No Model.) 5 Sheets—Sheet 1.

WITNESSES: Jos. A. Ryan, F. S. Stitt

INVENTOR Jacob Schaub.
BY Munn & Co.
ATTORNEYS

No. 657,569. Patented Sept. 11, 1900.
J. SCHAUB.
PHOTOGRAPHIC CAMERA.
(Application filed Oct. 5, 1899.)
(No Model.) 5 Sheets—Sheet 2.
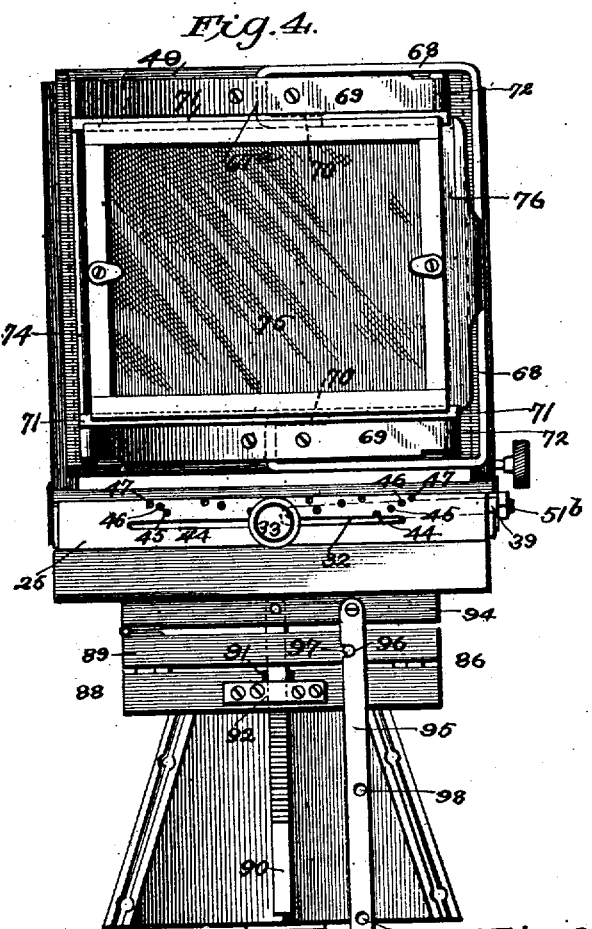
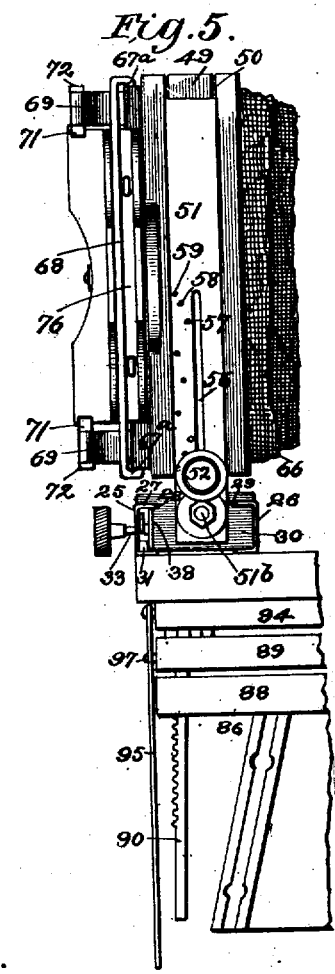
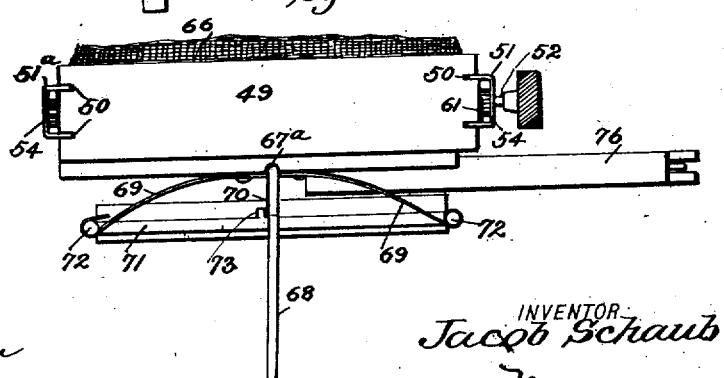
WITNESSES:
Jos. A. Ryan
F. S. Stitt
INVENTOR
Jacob Schaub
BY Munn & Co.
ATTORNEYS No. 657,569. Patented Sept. 11, 1900.
J. SCHAUB.
PHOTOGRAPHIC CAMERA.
(Application filed Oct. 5, 1899.)
(No Model.) 5 Sheets—Sheet 3.

WITNESSES:
Jos. A. Ryan
F. S. Stitt

INVENTOR
Jacob Schaub
BY Munn & Co.
ATTORNEYS

No. 657,569. Patented Sept. 11, 1900.
J. SCHAUB.
PHOTOGRAPHIC CAMERA.
(Application filed Oct. 5, 1899.)

(No Model.) 5 Sheets—Sheet 4.

WITNESSES:
Jos. A. Ryan
F. S. Stitt

INVENTOR
Jacob Schaub.
BY Munn & Co.
ATTORNEYS

No. 657,569. Patented Sept. 11, 1900.
J. SCHAUB.
PHOTOGRAPHIC CAMERA.
(Application filed Oct. 5, 1899.)
(No Model.) 5 Sheets—Sheet 5.

WITNESSES:
Jos. A. Ryan
F. S. Stitt

INVENTOR
Jacob Schaub.
BY Munn & Co.
ATTORNEYS

UNITED STATES PATENT OFFICE.

JACOB SCHAUB, OF LOGAN, UTAH, ASSIGNOR OF ONE-HALF TO ATEN BOWMAN HOWER, OF SAME PLACE.

PHOTOGRAPHIC CAMERA.

SPECIFICATION forming part of Letters Patent No. 657,569, dated September 11, 1900.

Application filed October 5, 1899. Serial No. 732,713. (No model.)

*To all whom it may concern:*

Be it known that I, JACOB SCHAUB, of Logan, in the county of Cache and State of Utah, have invented a new and useful Improvement in Cameras, of which the following is a specification.

My invention relates to cameras; and it has for its main object certain improvements especially applicable to cameras of the multiplying type, whereby the size of the field covered by the camera in changing from one exposure to the next is only equal to the size of the sensitive plate.

A further object of the invention is a camera having simple and efficient means for projecting the sensitive-plate support or frame away from the carriage in which it is mounted and simple and efficient means for reciprocating the carriage laterally on the base of the camera.

A further object of the invention is an improved device for confining the light-rays to the size of the "cut-out" or mask, and a further object of the invention is an improved ground-glass frame so arranged that the operation of inserting and removing the plate-holders or ground glass will not jar the camera or otherwise affect the position of the same.

With these ends in view my invention consists in certain combinations and arrangements of the parts and the details of construction thereof, which I shall first describe and then point out in the appended claims.

Reference is to be had to the accompanying drawings, forming part of this specification, in which like characters of reference indicate corresponding parts in all the views.

Figure 1:
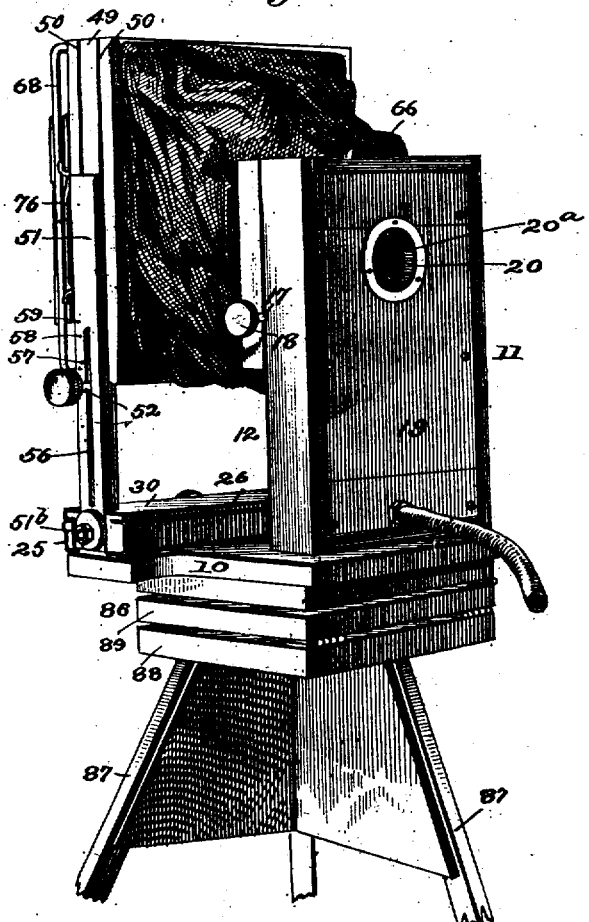
Figure 2:
Figure 3:
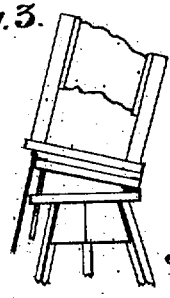
Figure 7:
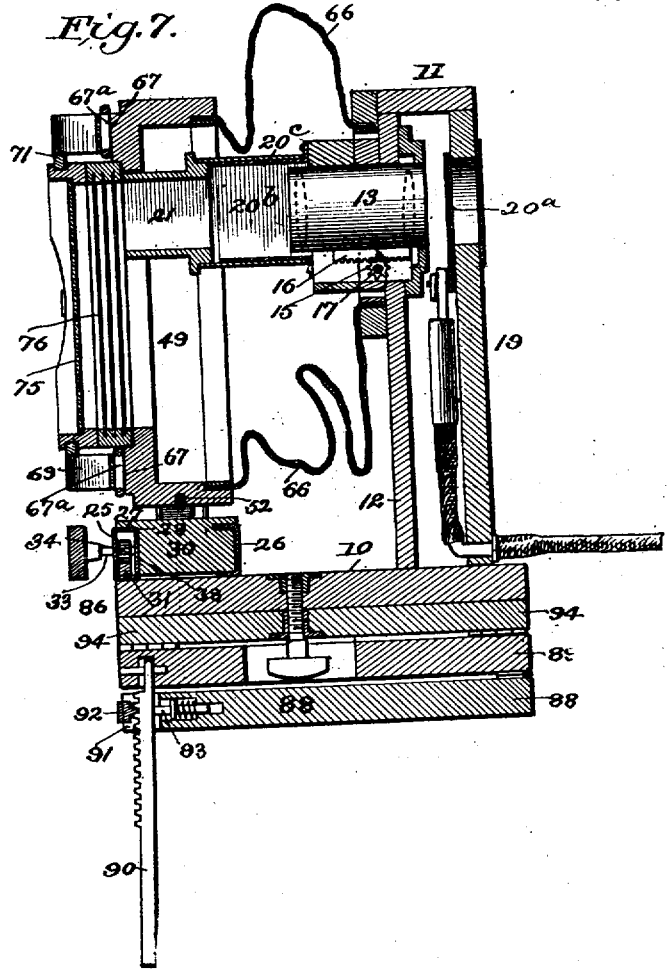
Figure 10:
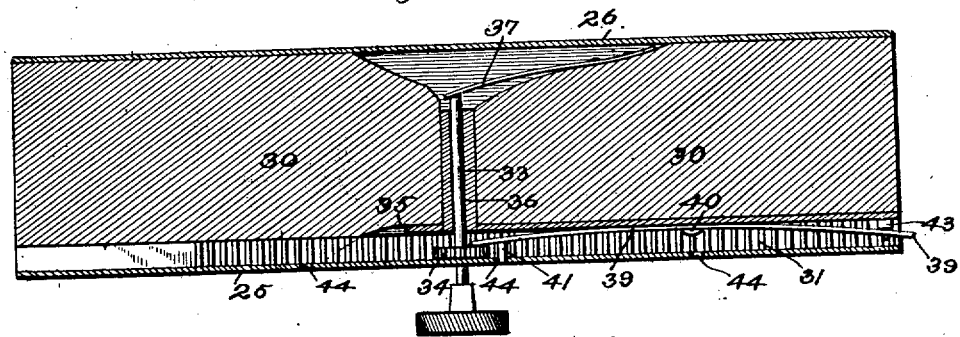
Figure 11:
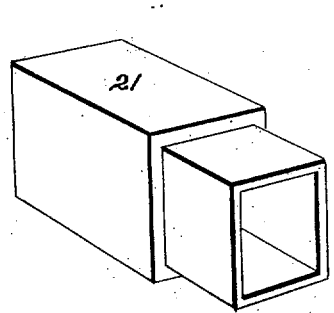
Figure 12:
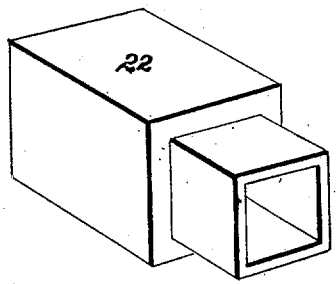
Figure 13:
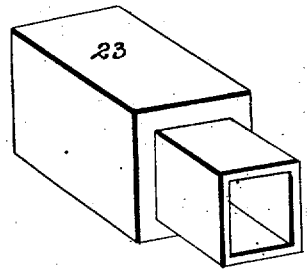
Figure 14:
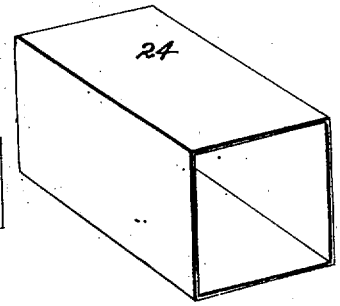

Figure 1 is a perspective view of my improved camera. Figs. 2 and 3 are diagrammatic views illustrating the different adjustments of the camera. Fig. 4 is a rear view. Fig. 5 is a side view. Fig. 6 is a detail plan view. Fig. 7 is a vertical longitudinal section. Fig. 8 is a detail sectional front elevation of the carriage and the frame for the ground glass and plate-holder. Fig. 9 is a vertical section on the line 9 9, Fig. 8. Fig. 10 is a horizontal section on the line 10 10, Fig. 8; and Figs. 11, 12, 13, and 14 are detail perspective views illustrating cut-out tubes of different sizes.

At one end of the base 10 is rigidly secured the front 11 of the camera, which front is in the form of a rectangular frame, with a preferably-integral rear side 12, containing the usual opening in its upper portion for the insertion of the lens-tube 13 and having a recess 14 below such opening for the reception of a pinion 15, meshing with a rack 16 on the lens-tube and mounted on the focusing-shaft 17, which is provided with the usual milled head 18 at the side of the frame. The detachable face 19 is provided with a sight-opening 20 and shutter $20^a$ therefor.

Fixedly secured to the rear side 12 of the front 11 and surrounding the lens-tube 13 is a confining-tube $20^b$, which extends rearwardly and is formed with a reduced extension $20^c$. The said extension is adapted to detachably hold cut-outs 21, 22, 23, and 24 (see Figs. 11 to 14) in the form of tubes arranged to fit over the said extension and each being of different cross-sectional areas at their rear ends, the respective areas being equal to such part of the sensitive field as it is desired to cut out at one exposure. The cut-out tubes, it will be observed, are stationary after they are once put in place on the confining-tube, and for the purpose of changing the position thereof with respect to the sensitive plate I move the whole back of the camera by the mechanism I shall now describe.

At the rear end of the base 10 are fixed the angular guides 25 and 26, preferably of angle brass, and their upper inwardly-turned flanges 27 are fitted in guideways 28 and 29 in the carriage 30. A rack-bar 31 extends along the bottom of the guide 32, and the latter is provided with a longitudinal opening 32 (see Fig. 4) just above said rack, through which is inserted a spindle 33, having a pinion 34, adapted to mesh in said rack-bar 31. The inner end of the spindle 33 is inserted into a chamber 35 in the carriage 30 and through an opening 36 therein to the opposite face thereof, where it is pressed upon by a leaf-spring 37, as shown in Fig. 10. A metal plate 38 is secured in the chamber 35, and on such plate is attached the spring-catch 39, which is pivoted on an axis 40 and is provided with a lateral stud 41 at one end and a plurality of apertures 42 at the other end, any one of which by swinging the latch on its axis is adapted to be engaged by a lug 43 on the metal plate 38.

Above the longitudinal opening 32 in the guide 25 are arranged a plurality of longitudinally-extending series of apertures 44, 45, 46, and 47, of which the first contains three apertures; the second, four; the third, five, and the fourth, six. These apertures form keepers for the spring-catch 39. By turning the spring-catch 39 on its axis the lateral stud 41 thereon may be brought in alinement with any one of these series, so that when the spindle 33 is turned the carriage 30 is caused to move laterally and the lateral stud 41 will successively engage with the apertures of that series with which it is in alinement, thereby causing the carriage to stop for three exposures, four exposures, five, &c., as the case may be. To release the stud 41 from one aperture, so that the carriage may be moved on farther, the pinion 34 is of such size that it overlaps the spring-catch 39, so that when an inward pressure is put upon the milled head of the spindle the pinion will press the catch 39 inward and retract the stud 41 from the aperture. When the carriage is then moved, the stud 41 will spring into the next aperture with a click, because by the tendency of the leaf-spring 37 on the spindle pressure is automatically taken off the catch 39 as soon as the operator's hand allows such spring to act. Opposite each aperture 42 on the spring-catch is an index-number "48," indicating the number of sections into which the sensitive plate is divided for exposures when an aperture receives the lug 43.

The frame 49, which is designed to hold the plate-holder and ground glass, is provided on its sides with guideways 50, arranged to receive angular guides 51 and 51ª, preferably of angle brass and secured at their lower ends in the carriage 30 by screws and a connecting-bolt 51ᵇ. By this means said frame 49 may be projected from and toward the carriage. To secure this movement, a shaft 52 is mounted in suitable bearings 53 and extends from side to side of the frame, and on each end of said shaft is a pinion 54, adapted to mesh in rack-bars 55 in the guides 51 and 51ª. The guide 51 is formed with an elongated slot 56 (see Fig. 5) adjacent its rack-bar, through which slot the shaft 52 extends, and with three longitudinally-extending series of apertures 57, 58, and 59, of which the first contains two apertures, the second three, and the third four. With these openings, which act as keepers, is adapted to engage the lateral stud 60 on one end of the pivoted spring-catch 61, whose other end is formed with a plurality of apertures 62, any one of which is adapted to receive a lug 63 on the bearing-plate 64. In the same manner as the lateral movements of the carriage described above the frame 49 may be reciprocated by the shaft 52, the stud 60 clicking successively into the apertures of the series with which it is in alinement and the shaft being pressed inwardly against the action of a spring 65 to release the stud. The apertures 62 are indexed to correspond to the apertures 42.

A bellows 66, formed of two independent sections of india-rubber cloth or the like, so that if one should be pierced the other would still exclude the light, is secured between the rear side 12 of the front 11 and the frame 49 and follows the movement of said frame and its carriage.

In practical operation the photographer selects the cut-out tubes or masks, which will divide the plate into the desired number of parts and which is stamped with a numeral for that purpose and inserts such tube over the reduced extension of the confining-tube 20ᵇ. The ground glass and plate being in place, the spring-catches 39 and 61 are arranged with the indexed apertures corresponding to the number on the cut-out received on their respective lugs 42 and 63, and the carriage is moved laterally from aperture to aperture of the corresponding series and an exposure made at each aperture, the frame 49 being in extreme closed or open position. The latter is now projected away from or toward the carriage until the next aperture on its guide is reached, when the carriage is again moved laterally, and so on.

As shown in Figs. 4 and 6, on the rear face of the upper and lower cross-bars of the frame 49 are formed recesses 67, in which are fulcrumed the U-shaped ends 67ª of a bail-lever 68, the said ends being held in their places by flat spring-bars 69, secured to the said cross-bars of the frame at their middle portion and having their ends free. The inner members 70 of the U-shaped ends form fingers adapted to bear against guide-bars 71, provided at their ends with arms 72, by which they are connected with the free ends of the spring-bars 69, so that when the lever 68 is raised the fingers will slide along and press the guide-bars 71 outwardly, as shown in Fig. 6, the members 70 of the clip being limited in their movement in one direction by the stops 73 on the guide-bars. The latter are connected at one side by the rod 74. The guide-bars are adapted to serve as a frame for and to hold the ground glass 75, which is formed with guideways for such purpose, and when the lever is in the position shown in Fig. 6 it is obvious that the ground glass may be easily inserted or withdrawn. The plate-holder 76 is inserted behind the ground-glass frame, and the lever is turned down, thus bringing the ground-glass frame tightly against the back of the plate-holder and holding the latter in position. With this construction the ground-glass frame moves directly away from the back of the camera, so that when in outward position the glass-holder and ground glass may be inserted or withdrawn without disturbing the position of the camera.

The stand of my improved camera comprises a head 86, arranged to receive legs 87 to form the tripod, and the platform 88 of such head has hinged thereto the leaf 89, whose free end is provided with a toothed bar 90, working in a recess 91 in the platform 88 and held in engagement with a tooth 92 by means of a spring-pressed pin 93. With this construction the camera may be tilted forward or backward at different angles.

In order to enable the camera to take diamond-shaped pictures or to be swung horizontally for groups or the like, a second leaf 94 is hinged to a free side of the leaf 89, and to this second leaf the camera is directly attached in the usual or any suitable manner. To a free side of the second leaf 94 is pivoted a strut 95, having a recess 96 in its edge adapted to take into a lug 97 on the leaf 89, whereby to hold the two leaves closely together, and also formed with an aperture 98 about halfway its length, which when it receives said lug holds the camera at an angle of about forty-five degrees. Another aperture 99 is formed near the free end of the strut, whereby to hold the camera at an angle of ninety degrees to the stand.

It will be seen that the whole back of my camera, which back is composed of the carriage 30 and frame 49, can be moved, carrying the bag or bellows with it, while the front of the camera remains stationary.

I of course do not confine myself to the exact number of divisions herein described into which the sensitive plate may be divided, as it is obvious the number may be varied to suit cameras of different sizes.

Having thus described my invention, what I claim as new, and desire to secure by Letters Patent, is—

1. A camera, comprising a base, a front supported on said base, a back movable laterally on said base, there being provided several series of keepers each of which series contains a different number of keepers, and a catch adapted to engage with the keepers of any series, as set forth.

2. In a camera, a laterally-movable back, devices for moving said back and for automatically stopping the same at intervals, and means for changing the intervals at which the back will automatically stop, as and for the purpose set forth.

3. In a camera, a base, a laterally-movable carriage on said base, said carriage being provided with upright guides one of which is formed with several series of keepers each containing a different number, a frame for the plate-holders fitted in said guides and provided with a spring-catch, and means for holding said catch in alinement with the different series, as set forth.

4. A camera, comprising a base, a front, guides on said base, one of which is formed with several series of apertures, the number of apertures being different in each series, a carriage movable in said guides, and a changeable spring-catch on said carriage adapted to engage with any one of the series of apertures, as set forth.

5. In a camera, a base, a front, guides on said base, one of which is formed with several longitudinally-extending series of apertures each containing a different number of apertures, a carriage movable in said guide, a spring-catch pivoted on said carriage and having a lateral stud adapted to successively enter the apertures of any one series, and means for holding said catch in alinement with different series, as set forth.

6. In a camera, a base, a front, guides on said base in the rear of the front and one of which is provided with a series of apertures and a rack-bar, a carriage movable in said guides, a spindle held to rotate in a bearing in said carriage and movable laterally in the apertured guide, the said spindle having a pinion meshing in said rack, a spring-catch on said carriage having a stud adapted to successively enter said apertures, and means whereby inward movement of said spindle will withdraw said stud, as set forth.

7. In a camera, a base, a front, guides on said base in the rear of the front, a carriage movable in said guides, a rack-bar in one of said guides, a spindle held to rotate in a bearing in said carriage and movable laterally in the last-named guide, the said spindle having a pinion meshing in said rack, a spring-catch on said carriage and arranged to engage the same at intervals, the said pinion lying against said catch, whereby an inward pressure of the spindle will disengage the catch from the guide, and a spring serving to push the spindle outward, as set forth.

8. In a camera, the combination with the carriage, of a frame adapted to receive the plate-holders and mounted to move in guides on said carriage toward and from the latter, rack-bars in said guides, a spring-pressed shaft extending across the said frame and having pinions meshing in said rack-bars, a spring-catch on said frame adapted to engage at intervals with one of the guides, and means whereby a longitudinal pressure on said shaft will disengage the catch from said guide, as set forth.

9. In a camera, a base provided with laterally-extending guides, one of which is formed with several series of keepers, each series containing a different number of keepers, a carriage fitted to move in said guides, a catch pivoted on said carriage and having a stud adapted to successively engage with the keepers of any one series, and means for holding said catch with its stud in alinement with different series, as set forth.

10. In a camera, a base, laterally-extending guides one of which is provided with several series of longitudinally-extending keepers each series containing a different number of keepers, a carriage fitted to move in said guides, and a spring-catch pivoted between its ends on said carriage and having a lateral stud at one end and a plurality of apertures at its other end, there being provided a lug on the carriage adapted to enter different apertures in the catch, as set forth.

11. In a camera, the combination with a base having lateral guides one of which is formed with several series of keepers, each series containing a different number of keepers and the number in each series representing the division of the sensitive field into a number of equal parts, and a carriage for the support of the sensitive field fitted in said guides and provided with a changeable catch arranged to engage with the keepers of any one series, said catch being formed with indices indicating the necessary position of the catch in order for it to divide the field into a certain number of parts, as set forth.

12. In a camera, the combination of a laterally-movable carriage, a vertically-movable frame for the plate-holders mounted in said carriage, changeable spring-catches for automatically stopping the lateral movements of the carriage and frame and the vertical movements of the frame whereby to divide the sensitive field into equal parts, said catches being provided with indices indicating the position of the catches necessary for the division of the field into certain parts, as and for the purpose set forth.

13. In a camera, the combination with the lens-tube, of a tube surrounding the lens-tube and projecting rearwardly therebeyond, and a series of open-ended cut-out tubes, each of which has one end corresponding approximately in size to the said rearwardly-projecting tube and adapted to fit thereon, the other ends of said cut-out tubes being of areas equal to the number of parts into which the sensitive field is to be divided by the tube, as set forth.

14. In a camera, a frame adapted to receive the plate-holders, a lever mounted on said frame and formed with fingers, spring-bars secured between their ends to said frame, and guide-bars adapted to receive the ground glass, said guide-bars being secured to the free ends of said spring-bars and being adapted for engagement with the fingers of the lever when the latter is raised, as set forth.

15. In a camera, a frame adapted to receive the plate-holders, a bail-lever mounted on said frame, spring-bars on said frame, and guide-bars adapted to receive the ground glass, and secured to said spring-bars, the said bars being engaged by said lever so that the movement of the latter will move the guide-bars as a whole away from and toward said frame, as set forth.

16. In a camera, a frame, a ground glass movable as a whole toward and from said frame and spring-pressed toward the latter, the plate-holder being adapted for insertion between the frame and glass whereby the pressure of the latter against the former will hold said plate-holder in place and a lever mounted on the frame and having a finger bearing upon said ground glass to move the same away from the frame, as set forth.

In testimony whereof I have signed my name to this specification in the presence of two subscribing witnesses.

JACOB SCHAUB.

Witnesses:
JOSEPH ODELL,
JOHN ALLEN.